United States Patent [19]

Cancasci, Jr.

[11] 4,316,188

[45] Feb. 16, 1982

[54] MULTIPLE FONT DISPLAY CONTROL

[75] Inventor: Maurice V. Cancasci, Jr., Mason, Ohio

[73] Assignee: Cincinnati Milacron Inc., Cincinnati, Ohio

[21] Appl. No.: 153,640

[22] Filed: May 27, 1980

[51] Int. Cl.³ .............................................. G06K 15/20

[52] U.S. Cl. .......................... 340/735; 340/146.3 MA; 340/732; 340/750

[58] Field of Search ............... 340/732, 735, 736, 748, 340/750, 146.3 MA

[56] References Cited

U.S. PATENT DOCUMENTS 3,721,856 3/1973 Dick .
3,792,462 2/1974 Casey .
3,803,583 4/1974 Manber .............................. 340/735
3,903,517 9/1975 Haffner .
4,052,719 10/1977 Hutt .
4,087,808 5/1978 Herndon, Jr. ............... 340/324 AD
4,107,786 8/1978 Masaki .
4,121,283 10/1978 Walker .

*Primary Examiner*—Alvin H. Waring
*Attorney, Agent, or Firm*—John W. Gregg

[57] ABSTRACT

The apparatus is for controlling the generation of dot matrix characters of a plurality of fonts for display on the screen of a cathode ray tube. The apparatus uses character generators responsive to signals representing a code specifying a particular character. The character generator for each font is driven by a clock derived from a single clock source. The outputs of the character generators can be selectively used to control the duty cycle of the cathode ray tube electron beam so as to display characters all of one font or mixed from all fonts.

10 Claims, 5 Drawing Figures

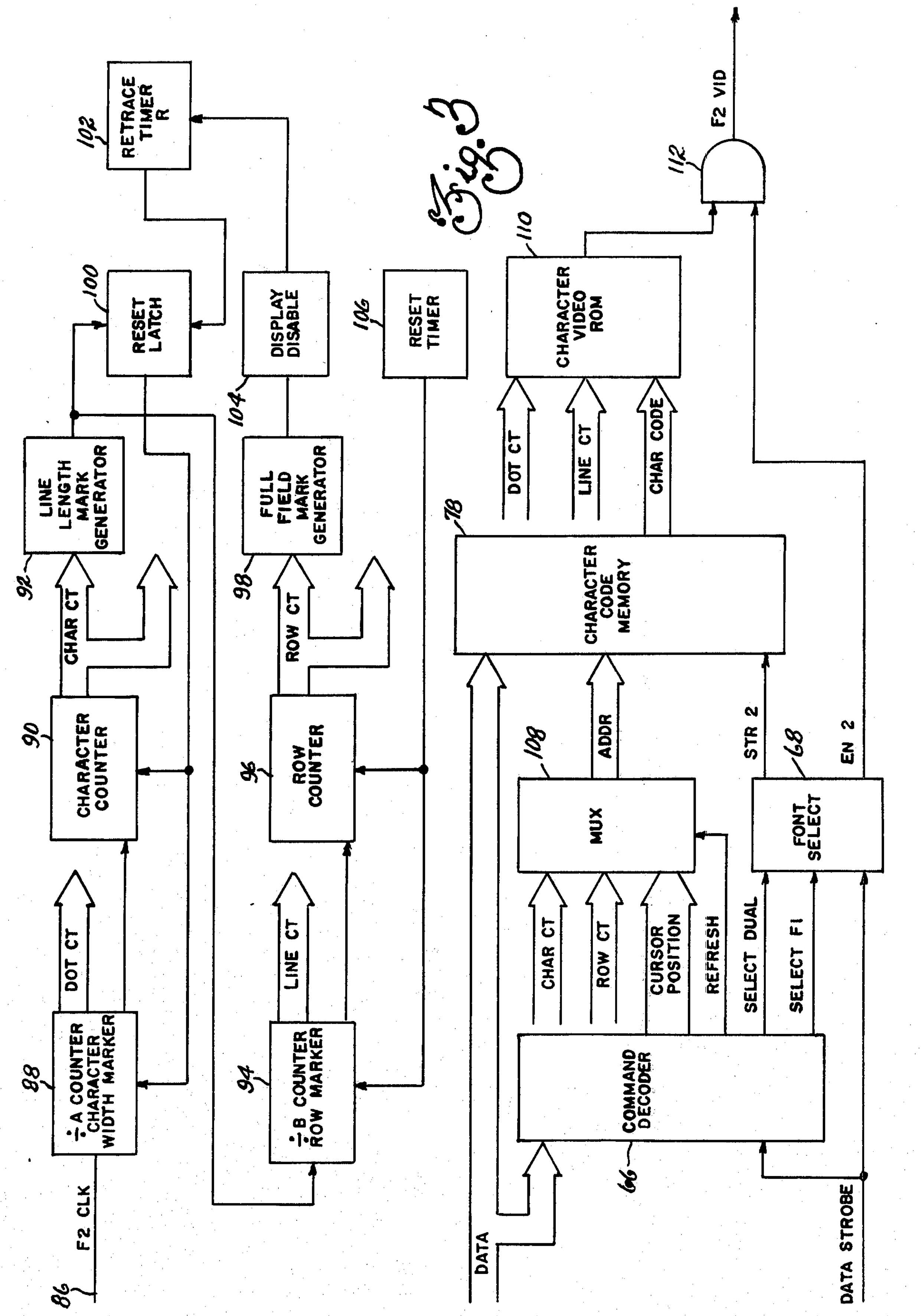

F2 CLK
86
÷ A COUNTER CHARACTER WIDTH MARKER
88
DOT CT
CHARACTER COUNTER
90
CHAR CT
LINE LENGTH MARK GENERATOR
92
RESET LATCH
100
RETRACE TIMER R
102
÷ B COUNTER ROW MARKER
94
LINE CT
ROW COUNTER
96
ROW CT
FULL FIELD MARK GENERATOR
98
DISPLAY DISABLE
104
RESET TIMER
106
Fig. 3
DATA
COMMAND DECODER
66
CHAR CT
ROW CT
CURSOR POSITION
REFRESH
SELECT DUAL
SELECT F1
DATA STROBE
MUX
108
ADDR
FONT SELECT
68
STR 2
EN 2
CHARACTER CODE MEMORY
78
DOT CT
LINE CT
CHAR CODE
CHARACTER VIDEO ROM
110
112
F2 VID

MULTIPLE FONT DISPLAY CONTROL

BACKGROUND OF THE INVENTION

The invention relates generally to computer numerical control and specifically to an apparatus for controlling the display of dot matrix characters on a cathode ray tube screen.

Because the information to be displayed with a computer numerical control is often of two of more types such as current machine status information and operator instruction information, it is desirable to display such information in different character fonts defining different character sizes and formats according to the way the types of information are to be used by the operator. For example, coordinate data for current axis positions should be readable from locations about the machine but removed from the control display so that an operator may perform manual machine positioning. On the other hand, it is satisfactory to display operator instruction data relating to speed overrides, part checking and the like so as to be readable only when standing relatively close to the control display.

The prior art has shown ways of producing characters of different formats in the same display by using a so-called pure video display wherein each character element corresponds to a phosphor dot of the display screen. This is quite cumbersome in that it requires that the state of the electron beam be defined for each and every phosphor dot individually.

Another scheme has been to mix dot matrix characters with pure video characters on the same display, but this is subject to the drawback of apparent wiggle between the two types of characters as well as requiring substantial storage to completely define the electron beam state for the pure video portion of the display.

Therefore, one object of this invention is to provide a video display controller capable of producing dot matrix characters of a plurality of fonts.

A further object of this invention is to generate characters of a plurality of fonts in such a way that their display on a cathode ray tube monitor shall be characterized by relative positional stability.

Other objects and advantages of the present invention shall be apparent from the following detailed description taken in conjunction with the drawings.

SUMMARY OF THE INVENTION

In accordance with one embodiment of the invention, an apparatus is provided for generating dot matrix characters of two fonts on the screen of a cathode ray tube being the principal display device of a computer numerical control. Character generation is achieved using dot position signals in conjunction with character code signals defining individual characters. The dot position signals are produced from two different clocks derived from a single clock source, thereby assuring a fixed spatial relationship of dot positions for both fonts on the display. Character font selection logic responsive to character font control signals generated by the control computer permits display of characters of either font separately or mixed.

BRIEF DESCRIPTION OF THE DRAWINGS

FIG. 3 is a block diagram of a character generator for dot matrix characters together with certain of the associated elements of the display controller.

DESCRIPTION OF THE PREFERRED EMBODIMENT

Figure 1:
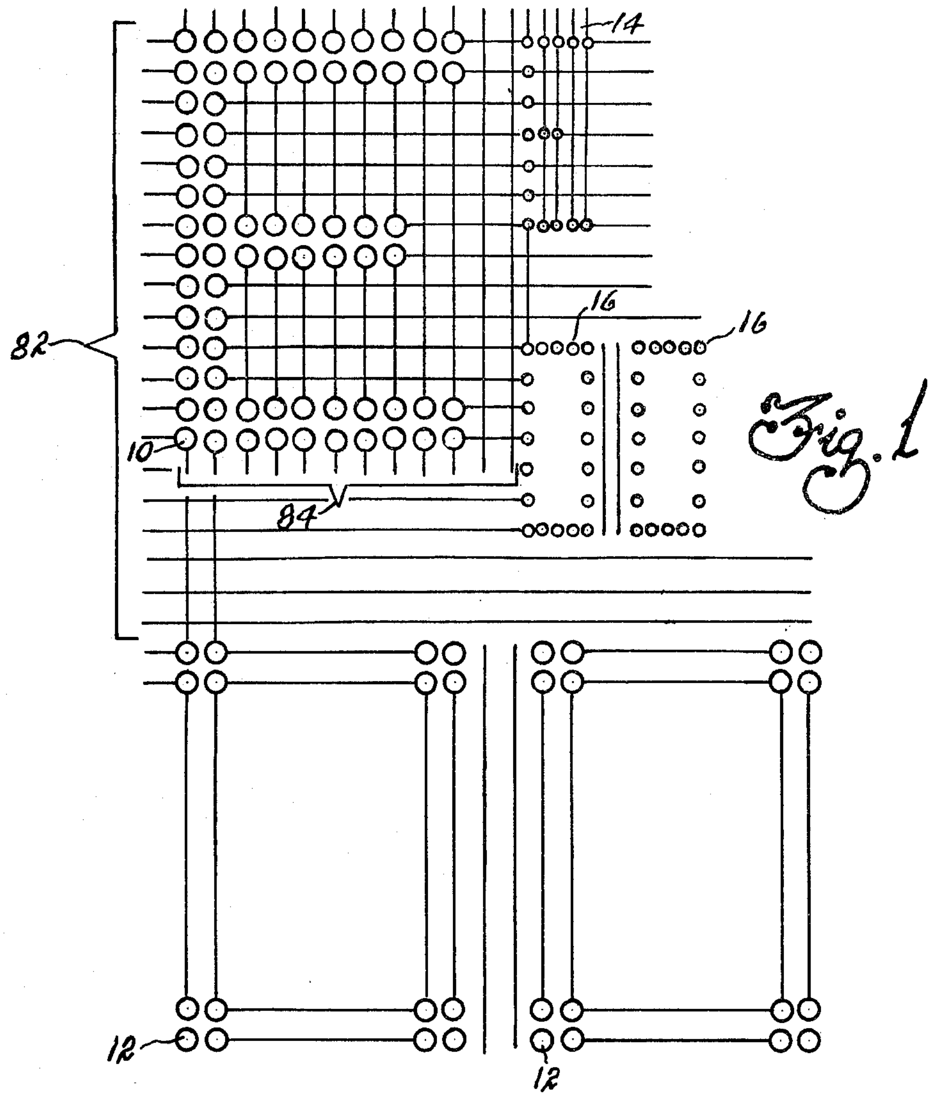
FIG. 1 shows characters and character space outlines for two dot matrix character fonts.

FIG. 1 shows two dot matrix character fonts that may be produced by one embodiment of the invention. As suggested by character outlines 12 and 16, each character to be displayed is defined by the spatial relationship of dots within a character matrix area. The character outlines 12 of a first font define a space measured by a width of ten dots and a height of fourteen dots, each falling on an imaginary horizontal line. To allow for character spacing in the display, the actual occupiable space for each character is described by a height of twenty lines and a width of twelve dot positions. In the case of the second font as indicated by the character outlines 16, the occupiable spaces are described by a height of ten lines and a width of seven dot positions; however, the characters themselves are limited to a height of seven lines and a width of five dots. As illustrated by the character 10, characters of the 10 by 14 matrix are displayed using double rows of dots, while those in the five by seven matrix are displayed using single rows of dots as illustrated by the character 14. The vertical spacing of lines of character matrices is invariant and limited by the particular combination of horizontal and vertical sweep rates of the display, the horizontal spacing of dots is dependent on the font. As shown in FIG. 1, the dot size for characters of the 10 by 14 matrix are considerably larger than the dot sizes for characters of the five by seven matrix, this being a result of the means used to control the duty cycle of the cathode ray tube (CRT) electron beam. As will be made clear hereinafter, the relative dot sizes are a function of the clock rates used to drive character generators during a horizontal sweep of the CRT electron beam. Each dot in a display results from impingement of the electron beam on phosphoresent spots deposited on the CRT screen.

Figure 2:
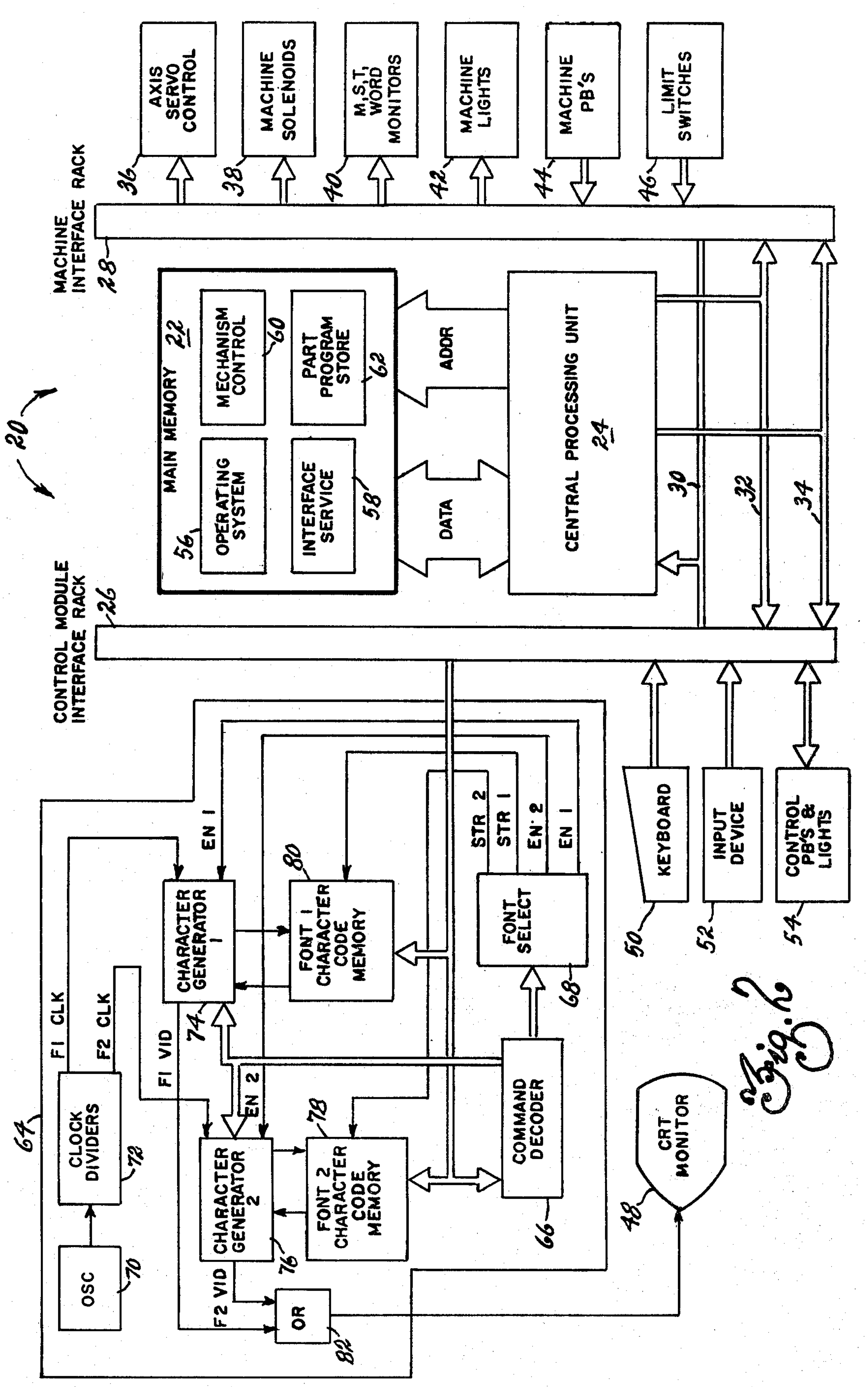
FIG. 2 is a general block diagram of the display controller and a computer numerical control in which it is used.

FIG. 2 is a general block diagram showing one embodiment of the invention and a computer numerical control in which it may be used. While the particular control components shown in FIG. 2 are those used in the ACRAMATIC computer numerical control manufactured by Cincinnati Milacron Inc., the exact definition and association of these components may vary from one control to another; and the disclosed invention may be implemented in any of the available computer numerical controls. Therefore, the exact details of the association of the components of the control shown in FIG. 2 should not be considered as limitations on the claimed apparatus.

The control computer indicated generally as 20 is made up of the following principal elements: a main memory 22; a central processing unit 24; interface racks 26 and 28; input data bus 30; output data bus 32; and data bus control 34. The central processing unit 24 communicates with the data and programs stored in main memory 22 via address and data buses. The overall control activity is directed by the operating system program 56 in cooperation with a workpiece program which may be stored in part program store 62. The operating system program 56, in cooperation with a mechanism control program 60, and interface service routines 58, will communicate via the central processing unit with the machine devices interfaced through the machine interface rack 28. Examples of the types of mechanisms typically interfaced therethrough include: an axis servocontrol 36 which may be used ultimately for control of machine tool slide motion; machine solenoids 38 which will operate dual state type mechanisms located on a machine; the M, S, and T word monitors 40 which transfer the states of auxiliary function, spindle speed, and tool storage commands to the machine mechanisms; machine indicating lights 42; machine push buttons 44; and machine mounted limit switches 46.

The principal means for communication between an operator and the computer control is via the devices interfaced through the control module interface rack 26 which include: a cathode ray tube monitor 48, a keyboard 50, a part program input device 52, such as tape reader or floppy disc drive, and the control mounted push buttons and indicating lights 54.

A CRT control module 64 is interfaced in control interface rack 26 to enable the display of two character fonts such as depicted in FIG. 1 on the face of the CRT monitor 48. When the operating system program 56 requires that data be displayed on the CRT monitor 48, a communication link is established through the central processing unit 24 to the CRT control module 64 over the output data bus 32. Signals are carried over the eight line wide bus identifying the desired characters, screen locations and font to be displayed. These signals are first received by the command decoder 66 which in turn passes signals to the font select circuitry 68 to generate the one of the strobe signals STR 1 and STR 2 required for loading character data into the appropriate one of the character memories 78 and 80. Once signals identifying characters have been loaded in either or both character memories 78 and 80, and during periods when new characters are not being received from the control computer, the character generators 74 and 76 generate timing signals derived from the F1 CLK and F2 CLK outputs of clock divider 72. These timing signals define particular locations on the screen of the CRT monitor 48 and are used in conjunction with the dot matrix character code signals by character generators 74 and 76 to produce video blanking signals. The video signals, which are input to the OR function 82, ultimately control the duty cycle of the electron beam of the CRT monitor 48. Because all timing signals are derived from the single source clock of oscillator 70, the timing signals created by the character generators 74 and 76 remain in synchronization; and hence, the position signals defined whereby have a fixed spatial relationship to one another in the display area of the CRT monitor 48.

FIG. 3 is a block diagram showing the pertinent elements of the character generator 76 in a generalized fashion, together with character code memory 78, the font select logic 68, and the command decoder 66 with its relevant outputs. Each of the character generators 74 and 76 will include counters 88, 90, 94, 96, a character video read-only memory 110, a multiplexer 108, and an AND gate 112. In addition to the character generators and memories, the control module 64 need only include one command decoder 66 and one font select circuit 68. Because the horizontal and vertical sweeps and retrace periods are not font dependent the retrace timer 102 and reset timer 106 need not be duplicated for each character generator. The reset latch 100 and display disable circuit 104 include some elements which are dedicated to a particular character generator and must to that extent be duplicated for each.

The character generators differ only in the rates of input clocks and count magnitude limits. As previously indicated, the characters displayed on the cathode ray tube monitor 48 are created by controlling the duty cycle of the electron beam as it sweeps the screen. The position of the beam within the matrix for a particular character determines whether or not it should be in a blanked (off) or unblanked (on) condition. Referring again to FIG. 1, it is apparent that the position of the beam may be described in terms of one of the lines 82, describing the vertical height of an occupiable space, and one of the columns 84 describing the horizontal width of the space.

Referring now to FIG. 3, an incoming clock 86, corresponding to the F2 CLK signal of FIG. 2 is input to a counter 88 which, while maintaining a dot count also marks the character column width. In this fashion, each incoming clock edge defines a dot location within the width of the combination of the character and its associated horizontal character-to-character space. The character column width marker output signal of counter 88 is input to counter 90 which maintains a count indicating the number of characters along a single line. The character count output signals of counter 90 are input to a line length mark generator 92 the output of which marks the end of a single line as decoded from the character count output of counter 90.

The line length mark corresponds to the point from which the electron beam horizontal sweep must be retraced in preparation for beginning the next horizontal sweep. Consequently, the line length mark is used to set the reset latch 100 which holds counters 88 and 90 in a reset condition during the horizontal retrace time as monitored by the retrace timer 102. The line length mark signals are also input to counter 94 which outputs a row mark signal in response to decoding a number of line length marks equivalent to the number of lines required to complete a full row of occupiable spaces.

The row marker output of counter 94 is input to counter 96 which maintains a count of the rows. The row count output is input to the full field mark generator 98 where the row count is decoded to indicate that the last occupiable character space of the last row has been reached. The full field mark output of the full field mark generator 98 is passed on to the display disable circuit 104 which is used to hold the horizontal retrace timer in a reset condition while at the same time inhibiting the generation of an unblank condition of the electron beam. The display will be held in a disable condition during the vertical retrace period which begins sometime after the beam has reached the last dot position of the last line of the last row. The reset timer 106 is associated with the vertical retrace time fixed by the particular CRT monitor being used.

It should be clear from the foregoing that the outputs of counter 88 and 94 fully define all dot locations within a particular character font matrix. At the same time, the outputs of counters 90 and 96 define all character positions within a displayed area. In the case of a character generator for 10 by 14 dot matrix characters the counter 88 produces column width mark signals upon attaining a count of 12, and counter 94 produces row mark signals upon reaching a count of 20. For this font, when the character count output of counter 90 reaches 32, the line length mark generator initiates a set on the reset latch 100 and when the row count output of counter 96 reaches 12 the full field mark generator 98 will produce an output to initiate the activity of the display disable circuit 104.

Considering a character generator for the five by seven dot matrix characters, the counter 88 will produce a character column width mark signal when that counter has reached the number seven. Correspondingly, the line counter 94 will have reached its limit and generate a row mark signal when it has been incremented to the number 10. For this character size, the character counter 90 is considered to have reached its limit when it has been counted to the number 80; and when this number is decoded by the line length mark generator 92, it will set the reset latch 100. The corresponding row count limit of the row counter 96 is 24; and once this number has been reached, the full field mark generator 98 will output a signal to the display disable circuit 104 to initiate its activity.

The character generator produces signals representing the appropriate state of the CRT electron beam by means of a character video read-only memory 110. By presenting memory 110 with input signals representing the desired character symbol, together with the line count, and dot count signals defining present dot position within a character matrix, the memory converts these inputs to an output signal representing the state of the electron beam at the present dot position for the character being generated. The dot count and line count signals as already indicated are obtained from counters 88 and 94 respectively. The duration of output counts of counter 88 depends on the rate of the incoming clock. Therefore, a higher input clock rate results in shorter periods of discrete dot position signals and consequently reduced areas of illumination on the face of the CRT. In particular, the character generator of the 10 by 14 dot matrix font is driven by an 8 Mhz. clock; and the character generator of the five by seven dot matrix font is driven by a 12 Mhz. clock. These clocks are both derived from a 24 Mhz. clock in oscillator 70, of FIG. 2.

Although signals representing the particular character to be displayed could be received from the main memory 22 as required, this would unduly burden the processing time of control computer 20 and therefore the display control module 64 is provided with character code memories 78 and 80 of FIG. 2. Character code signals are stored in the character code memories in such a manner that the memory location occupied by signals representing a particular character correspond to the position on the display in which that character is to appear. Referring to FIG. 3, during transmission of display information from the control computer 20 to the display control module 64, signals specifying character positions are decoded by the command decoder 66 and transferred to a multiplexer 108, to control the loading of new character code signals into the character code memory 78. Multiplexer 108 is given an input indicating that it is to be operated in a data entry mode as opposed to a display refresh mode. The decoded character position signals are then transferred to character code memory 78 as an address; and upon receipt of the character code signals and a strobe signal the character code signals are loaded into the memory. For maximum flexibility, each of the character code memories 78 and 80 has the capacity to store character code signals in sufficient quantity to specify characters for a full field or in other words to specify a particular character for each of the occupiable spaces of the display area for the selected character font.

In addition to decoding character position data, the command decoder 66 also decodes the font identification signals transferred from control computer 20. During the character code memory loading operation, the appropriate font is identified by the command decoder 66; and the incoming strobe signal is then routed by the font select 68 to produce a font strobe for the designed character code memory, shown as STR1 and STR2 in FIG. 2.

During display refresh, the output of the character generators 74 and 76 is controlled by stored signals indicating whether the display is to be for one or the other of the possible fonts or for both in a mixed fashion. During display refresh, the multiplexer 108 transfers character count and row count signals from the character generator counters to the associated code memory as addresses. Irrespective of whether a particular font has been selected to be displayed, the multiplexer 108 continues to present address data made up from the character count and row count signals to the character code memory during fresh operation. Likewise the character code memory continues to output character code signals to the character video read-only memory 110 which in conjunction with the dot count and line count signals continues to produce its video output signal which is then input to the AND gate 112. AND gate 112 is the point at which the font selection determines the controlling output to be presented to the CRT monitor 48. The font select circuitry 68 produces font enable signals corresponding to EN1 and EN2 of FIG. 2 in response to signals decoded by the command decoder 66, and these font enable signals are then ANDED with the video signals at the respective AND gates 112 of each character generator. The outputs of AND gates 112 are input to OR 82 of FIG. 2.

Figure 4:
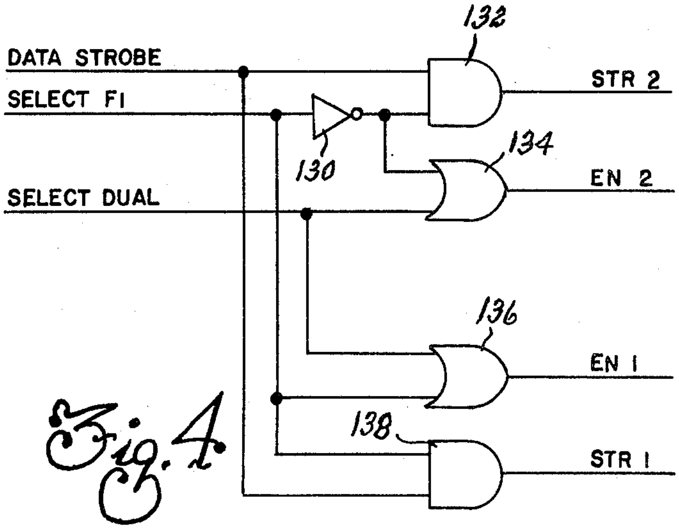
FIG. 4 is a logic diagram of character font select circuitry.

FIG. 4 is a schematic diagram of the font selection logic as used in the preferred embodiment. The strobe signals used to load character symbol signals in the character code memories are derived from a common data strobe signal produced by the control computer 20 and are labeled STR2 and STR1. The strobe selection is a function of the font selected which is controlled by the Select F1 signal, an input to the inverter 130 and AND gate 138. The output of inverter 130 is an input to AND gate 132. Therefore, when Select F1 is in a true condition, the output of inverter 130 will be in a false condition; and the output of AND gate 132 will also be false. With the Select F1 input in a true condition, the output of AND gate 138 is dependent on the state of the Data Strobe signal. Alternatively, when the Select F1 input is false, the output of inverter 130 will be true; and the output of AND gate 132 will be dependent on the Data Strobe input.

Two signals are used to control the selection of a font for display purposes. The first of these is Select Dual an input to th OR gates 134 and 136, and the other is Select F1 which is input directly to the OR gate 136, and after inversion, to the OR gate 134. To produce a display of mixed fonts, it is necessary that the character generators 74 and 76 simultaneously place electron beam blanking information in the video signals F1 VID and F2 VID of FIG. 2 to be OR'd at OR 82. Since each of the character generators 74 and 76 continuously produces blanking information at the output of the associated memory 110 during refresh, this blanking information can be transmitted to OR 82 by making the associated enable signal, shown as EN2 in FIG. 3, true. Therefore, the character generators 74 and 76 can simultaneously transmit blanking signals to OR 82 when both EN1 and EN2 are true. This can be accomplished by merely driving the Select Dual input to a true condition therefore making the output of OR gates 134 and 136 both true.

When the display is to be restricted to only one font, the Select Dual input will be false and font selection is dependent on the state of the Select F1 input. To select the font arbitrarily designated as font 1, the Select F1 input must be true making the output of inverter 130 false and, thereby, making the combination of inputs to the OR gate 134 both false so its output, EN2, will be false. With Select F1 input true, one input to the OR gate 136 is true and thus the EN1 signal is also true. With the select dual input 124 false, in order to select the second font, arbitrarily designated as font 2, the Select F1 input must be false, making the output of inverter 130 true and consequently causing the output of OR gate 134, EN2 to be true. With Select F1 input false, and Select Dual false, both inputs to OR gate 136 are false and consequently its output EN1 is false.

Figure 5:
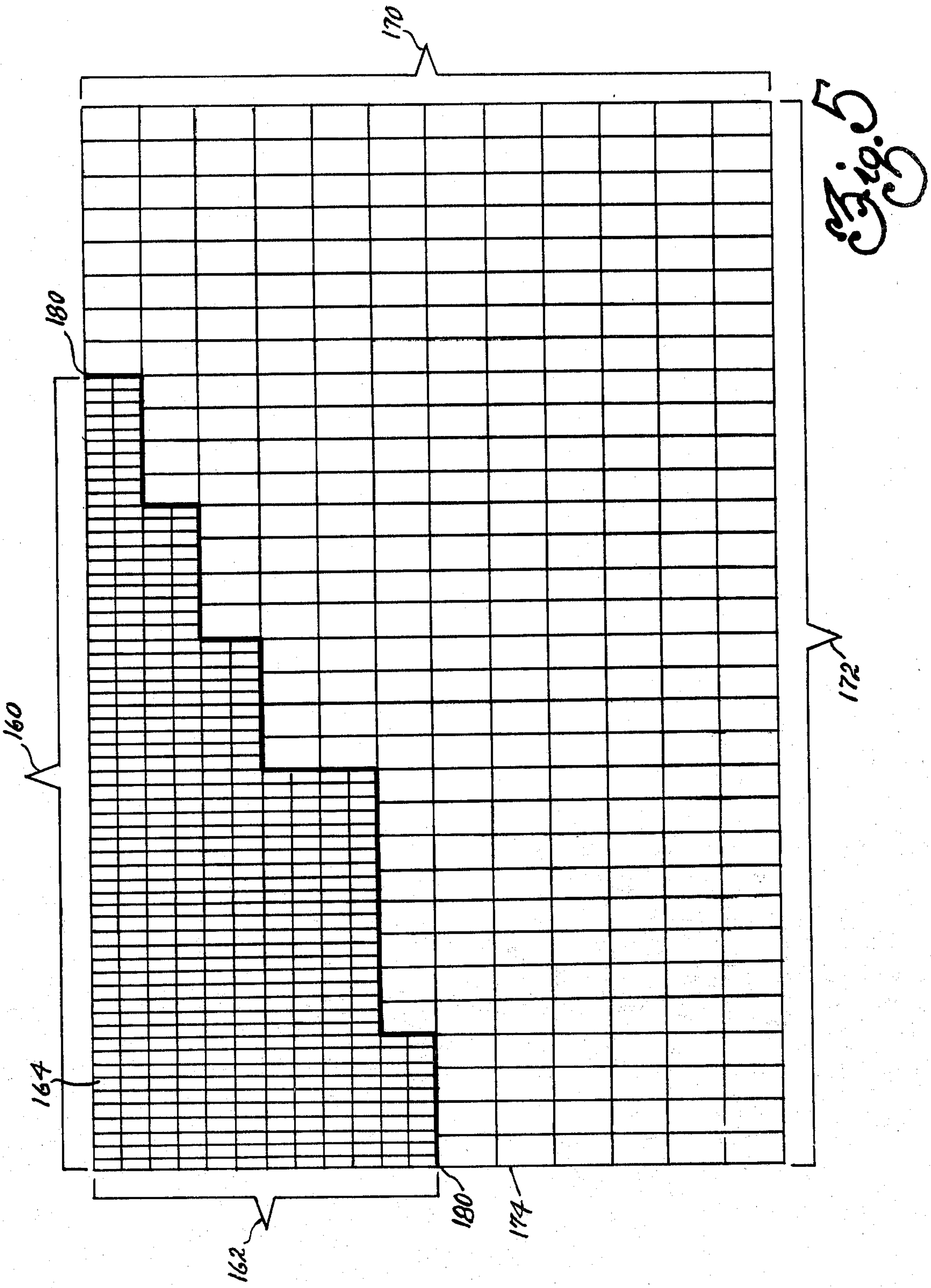
FIG. 5 is a layout of a cathode ray tube display area showing the relative positions of occupiable character spaces for two character fonts.

FIG. 5 shows the relationship of occupiable character spaces of the two fonts in the display area. Considering the five by seven dot matrix characters, the horizontal spacing is illustrated by the marked off spaces within the bracket 160. The corresponding vertical spacing is indicated by the areas marked off within the bracket 162. Each occupiable character space such as, for example, the space designated 164 has a width of seven dots and a height of 10 lines as shown in FIG. 1. Assuming that the character code memory has a capacity for storing character code signals of a sufficient quantity to fill the display field with characters of this font, the bracketed areas 160 and 162 could be extended to encompass the entire display area and any part thereof. A full extension of bracketed area 160 would result in a horizontal width including 80 occupiable character spaces. A vertical extension of the bracketed space 162 to the full height of the display area would result in a vertical height of 24 horizontal rows.

Considering the 10 by 14 dot matrix characters, the horizontal spacing is indicated by the spaces within the bracket 172 and vertical spacing indicated by the spaces within bracket 170. Each occupiable character space for this font such as, for example, space 174 has a horizontal width of 12 dots and a vertical height of 20 lines as shown in FIG. 1. The total display area for this font is then divided into 12 horizontal rows as indicated by the spacing within the bracket 170 and 32 vertical columns as indicated by the spacing within the bracket 172. The character code memory for the 10 by 14 dot matrix font should ideally have a capacity for storing a sufficient number of character code signals to generate characters for all of the occupiable character spaces defined by the spacing described above.

Because the dot and character position signals produced by the character generators 74 and 76 are derived from a single source clock, the occupiable character spaces of each font within the display area have a fixed positional relationship to one another. This relationship is best illustrated by comparison of the spatial relationship of occupiable spaces along the arbitrarily drawn boundary 180. As a consequence of this spatial relationship, it is essential that the assigned character positions not be overlapped when operating the display in a mixed font mode.

While the invention has been illustrated in some detail according to the preferred embodiments shown in the accompanying drawings and while the preferred illustrated embodiments have been described in some detail there is no intention to thus limit the invention to such detail. On the contrary, it is intended to cover all modifications, alterations and equivalents falling within the spirit and scope of the appended claims.

What is claimed is:

1. An apparatus for mixed display of dot matrix characters of a plurality of matrix sizes, represented by character code signals of a plurality of fonts, each font corresponding to one of the matrix sizes, the display being produced by impingement of a sweeping electron beam on a phosphorescent screen of a cathode ray tube, the apparatus comprising:

(a) timing means for producing a plurality of timing signals of different frequencies from a single clock source;

(b) a plurality of storing means for storing character code signals representing characters of a plurality of fonts, each storing means storing character code signals of only one font;

(c) a plurality of character generating means, each generating means being coupled to one of the storing means and being responsive to one of the timing signals to produce a video signal for controlling the duty cycle of the cathode ray tube electron beam, whereby a plurality of video signals are produced; and (d) means for controlling the cathode ray tube electron beam with the plurality of video signals.

2. The apparatus of claim 1 wherein each storing means has the capacity to store signals of a sufficient number to define a character in the associated font for each occupiable character space of that font on the cathode ray tube screen.

3. The apparatus of claim 1 wherein each of the character generating means comprises:

(a) first counting means for counting a number of recurrences of one of said timing signals to produce a character width mark signal;

(b) second counting means for counting a number of recurrences of the character width mark signal;

(c) means responsive to the second counting means for producing a line length mark signal;

(d) third counting means for counting a number of recurrences of the line length mark signal to produce a character row mark signal;

(e) fourth counting means for counting a number of recurrences of the character row mark signal;

(f) means responsive to the fourth counting means for producing a full field mark signal;

(g) means responsive to the second and fourth counting means for recalling the character code signals from the storing means;

(h) means responsive to the recalled character code signals and the first and third counting means for producing one of the video signals;

(i) means responsive to the line length mark signal for inhibiting the operation of the first and second counting means for a predetermined period; and (j) means responsive to the full field mark signal for inhibiting the operation of the first, second, third and fourth counting means for a predetermined period.

4. An apparatus for independent and mixed display of dot matrix characters of a plurality of matrix sizes represented by character code signals of a plurality of fonts, the display being produced by impingement of a sweeping electron beam on a phosphorescent screen of a cathode ray tube, the apparatus comprising:

(a) timing means for producing a plurality of timing signals of different frequencies from a single clock source;

(b) a plurality of storing means for storing character code signals representing characters of a plurality of fonts, each storing means storing character code signals of only one font;

(c) a plurality of character generating means, each generating means being coupled to a storing means and being responsive to a selected timing signal to produce a video signal for controlling the duty cycle of the cathode ray tube electron beam at the screen, whereby a plurality of video signals are produced;

(d) means for controlling the cathode ray tube electron beam with a selected one of said video signals; and (e) means for controlling the cathode ray tube electron beam with the plurality of video signals.

5. The apparatus of claim 4 wherein the plurality of character fonts comprises:

(a) a first font of characters having a matrix width of ten dots and a matrix height of fourteen dots; and (b) a second font of characters having a matrix width of five dots and a matrix height of seven dots.

6. The apparatus of claim 5 wherein the number of occupiable character spaces of the first font are divided into twelve rows of 32 characters and the number of occupiable character spaces of the second font are divided into 24 rows of 80 characters.

7. The apparatus of claim 6 wherein the storing means associated with the first font has the capacity to store signals to define 384 characters and wherein the storing means associated with the second font has the capacity to store signals to define 1920 characters.

8. The apparatus of claim 7 wherein the timing signal associated with the first font has a frequency of eight megahertz and the timing signal associated with the second font has a frequency of 12 megahertz.

9. The apparatus of claim 8 wherein the character generating means of the first font comprises:

(a) first counting means for counting twelve recurrences of the timing signal for the first font to produce a first font character width mark signal;

(b) second counting means for counting recurrences of the first font character width mark signal;

(c) means responsive to the second counting means for producing a first font line length mark signal upon detecting an accumulation of 32 recurrences of the first font character width mark signal;

(d) third counting means for counting 20 recurrences of the first font line length mark signal to produce a first font character row mark signal;

(e) fourth counting means for counting recurrences of the first font character row mark signal;

(f) means responsive to the fourth counting means for producing a first font full field mark signal upon detecting an accumulation of 12 recurrences of the character row mark signal;

(g) means responsive to the second and fourth counting means for recalling the character code signals from the storing means of the first font;

(h) means responsive to the recalled character code signals of the first font and the first and third counting means for producing a first font video signal;

(i) means responsive to the first font line length mark signal for inhibiting the operation of the first and second counting means for a predetermined period of time; and (j) means responsive to the first font full field mark signal for inhibiting the operation of the first, second, third and fourth counting means for a predetermined period of time.

10. The apparatus of claim 9 wherein the character generating means of the second font comprises:

(a) fifth counting means for counting seven recurrences of the timing signal for the second font to produce a second font character width mark signal;

(b) sixth counting means for counting recurrences of the second font character width mark signal;

(c) means responsive to the sixth counting means for producing a second font line length mark signal upon detecting an accumulation of 80 recurrences of the second font character width mark signal;

(d) seventh counting means for counting ten recurrences of the second font line length mark signal to produce a second font character row mark signal;

(e) eighth counting means for counting recurrences of the second font character row mark signal;

(f) means responsive to the eighth counting means for producing a second font full field mark signal upon detecting an accumulation of 24 recurrences of the character row mark signal;

(g) means responsive to the sixth and eighth counting means for recalling character code signals from the storing means of the second font;

(h) means responsive to the recalled character code signals of the second font and the fifth and seventh counting means for producing a second font video signal;

(i) means responsive to the second font line length mark signal for inhibiting the operation of the fifth and sixth counting means for a predetermined period of time; and (j) means responsive to the second font full field mark signal for inhibiting the operation of the fifth, sixth, seventh and eighth counting means for a predetermined period of time.

* * * * *